Sept. 22, 1942.  L. E. RESSEGGER  2,296,404
COMBINATION SPOON AND BOTTLE OPENER
Filed July 22, 1939
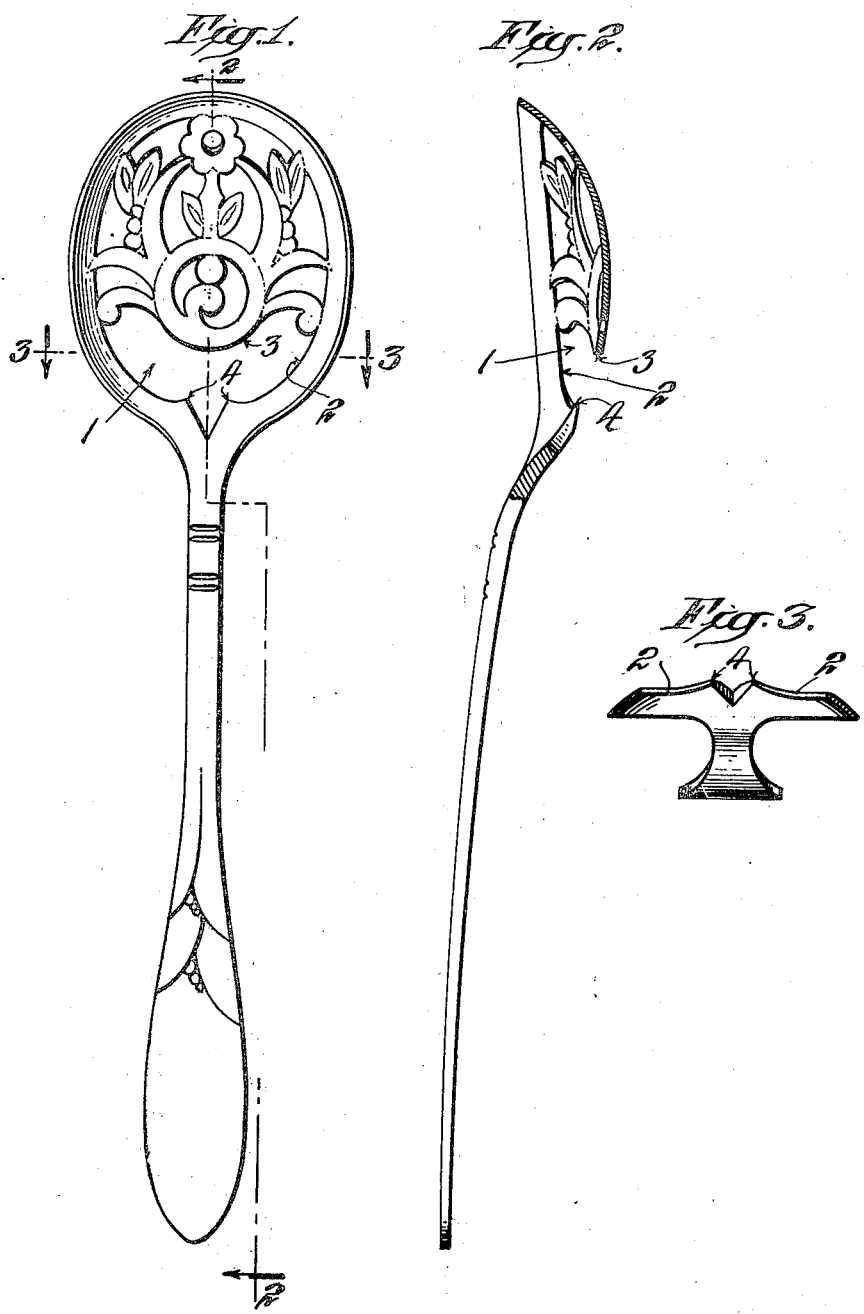
INVENTOR
LLOYD E. RESSEGGER
BY
ATTORNEYS Patented Sept. 22, 1942

2,296,404

UNITED STATES PATENT OFFICE 2,296,404

COMBINATION SPOON AND BOTTLE OPENER

Lloyd E. Ressegger, Oneida, N. Y., assignor to Oneida Ltd., Oneida, N. Y., a corporation of New York Application July 22, 1939, Serial No. 285,899

3 Claims. (Cl. 30—123)

This invention relates to improvements in spoons, it being the object of the invention to provide a spoon which may be used both for service of ice cubes, olives, cherries, small onions, etc., in the making or mixing of alcoholic and other drinks and also as a bottle or jar opener by the removal therefrom of its closure means, usually in the form of a metal cap, the vertically fluted apron or depending portion of which is yieldingly interlocked with the laterally projecting lip usually present in the bottle neck.

In the accompanying drawing—

Figure 1 is a plan view of a spoon embodying the present invention;

Figure 2 is a longitudinal section of the same on the line 2 of Figure 1, and

Figure 3 is a cross-section thereof on the line 3 of Figure 1.

The spoon there shown, which is of a shape suitable for use in the removal of ice cubes, olives, fruits, etc., from bottles, jars and the like and their use in the making or mixing of drinks and for other purposes, is provided in its bowl with openings for the drainage from the bowl of the water or other liquid from which the ice cubes, olives, etc., have been removed.

These drainage openings include one at the heel of the bowl lettered 1 which not only provides generally for such drainage but also adapts the spoon for use as a bottle opener or the like when used in conjunction with bottles or the like having crown caps. For this purpose, the opening 1, which is at the heel of the bowl and transverse to the spoon handle is so shaped on its outer and inner walls as to conform to the curvature of the cap and at its outer edge or wall 2 that, when applied to a bottle for the removal of its cap, it will engage under the lower edge or lip of the cap, while the outer edge or wall 3 will engage the top of the cap so as to give the necessary leverage to the spoon to detach the cap from the bottle neck when the spoon handle is moved upwardly. This opening 1 may constitute the sole drainage means for the bowl of the spoon or it may be used for drainage purposes in addition to other drainage openings, such as those shown.

To facilitate the engagement of wall 2 with the bottle cap to be removed such wall instead of having its cap-engaging portion continuous or unbroken, may be formed with a cut or filed away V-shaped portion midway of its length to provide outwardly extending portions or points 4 which, on the cap removal operation will readily engage the flutes of the cap for such purpose.

What is claimed is:

1. A combined spoon and bottle opener comprising a spoon handle and bowl having a heel adjacent said handle and provided at the heel of its bowl with a drainage opening transverse to the spoon handle and the inner and outer walls whereof conform to the shape and curvature of a bottle cap, the inner wall thereof being adapted to engage under the cap apron and the outer wall thereof to rest upon the top of the cap for giving leverage to the spoon to detach the cap from the bottle neck when the spoon handle is moved upwardly.

2. A combined spoon and bottle cap opener comprising a spoon handle and bowl having a heel adjacent said handle and provided with a plurality of drainage openings lengthwise of the spoon and including at the heel of the bowl a drainage opening transverse to the spoon handle and the inner and outer walls whereof conform to the shape and curvature of a bottle cap and the inner wall whereof is adapted to engage under the cap apron and the outer wall thereof to rest upon the top of the cap for giving leverage to the spoon to detach the cap from the bottle neck when the spoon handle is moved upwardly.

3. A combined spoon and bottle cap opener comprising a spoon handle and bowl having a heel adjacent said handle and provided with a plurality of drainage openings lengthwise of the spoon and including at the heel of the bowl a drainage opening transverse to the spoon handle and the inner and outer walls whereof conform to the shape and curvature of a bottle cap and the inner wall whereof is adapted to engage under the cap apron and the outer wall thereof to rest upon the top of the cap for giving leverage to the spoon to detach the cap from the bottle neck when the spoon handle is moved upwardly, the inner wall of said opening being cut away to provide points to project under the cap apron.

LLOYD E. RESSEGGER.